United States Patent
Fairall et al.

(10) Patent No.: US 12,506,428 B2
(45) Date of Patent: Dec. 23, 2025

(54) PORTABLE GENERATOR

(71) Applicant: Wright Electric Inc., Ballston Spa, NY (US)

(72) Inventors: Earl Fairall, Ballston Spa, NY (US); Jeffrey M. Engler, Ballston Spa, NY (US); David Laselle, Ballston Spa, NY (US); Subhashree Rajagopal, Ballston Spa, NY (US)

(73) Assignee: Wright Electric Inc., Ballston Spa, NY (US)

( * ) Notice: Subject to any disclaimer, the term of this patent is extended or adjusted under 35 U.S.C. 154(b) by 1 day.

(21) Appl. No.: 18/586,243

(22) Filed: Feb. 23, 2024

(65) Prior Publication Data

US 2024/0291408 A1 Aug. 29, 2024

Related U.S. Application Data

(60) Provisional application No. 63/448,163, filed on Feb. 24, 2023.

(51) Int. Cl.
*H02P 9/00* (2006.01)
*H02P 9/02* (2006.01)

(52) U.S. Cl.
CPC ..................... *H02P 9/02* (2013.01)

(58) Field of Classification Search
CPC . H02P 9/02; H02K 5/04; H02K 11/33; H02K 7/1815
See application file for complete search history.

(56) References Cited

U.S. PATENT DOCUMENTS

| | | | | |
|---|---|---|---|---|
| 2005/0242783 | A1* | 11/2005 | Nakagawa | H02M 5/458 322/28 |
| 2009/0322096 | A1* | 12/2009 | Errera | F02B 63/04 165/185 |
| 2010/0013243 | A1* | 1/2010 | Halsey | F02C 9/26 290/40 A |
| 2010/0283256 | A1* | 11/2010 | Bianchi | H02K 9/19 290/1 A |
| 2023/0387846 | A1* | 11/2023 | Saha | H02P 25/22 |

* cited by examiner

*Primary Examiner* — Julio C. Gonzalez
(74) *Attorney, Agent, or Firm* — Nutter McClennen & Fish LLP

(57) ABSTRACT

A portable generator has an electric machine and a prime mover to rotate the electric machine. The portable generator has a power converter to receive power from the electric machine, convert the received power, and output the converted power. The portable generator has a housing to enclose the electric machine, the prime mover, and the power converter. The portable generator has a control system. The control system operates the power converter to output the converted power at a power rating of at least 600 kW. The control system then determines an output power demand and determines a rotational speed target after determining the output power demand. The control system then reduces a rotational speed of the electrical machine using the power converter after determining the rotational speed target.

17 Claims, 7 Drawing Sheets

| Specifications | |
|---|---|
| Power | 633kW |
| LxWxH | 84"x104"x90" (463L pallet) |
| Weight (dry) | 7,300lbs |
| Fuel | All MIL Standardized Fuels: Diesel, JP-8, JET A/B, etc |
| Fuel Capacity | 400 gallons |
| Fuel Consumption | 35.2 g.p.h. |
| Time Before Refuel | 11 hrs @ F.L.A. |
| Voltage | 120/208/240/416 |
| Frequency | 50/60Hz, 400Hz |
| Temperature Range | -40°F to 160°F |
| EMC | Compliant per MIL-STD 461F |

Figure 6

PORTABLE GENERATOR

PRIORITY

This patent application claims priority from provisional U.S. patent application No. 63/448,163, filed Feb. 24, 2023, entitled, "PORTABLE GENERATOR," and naming Earl Fairall et al. as inventors, the disclosure of which is incorporated herein, in its entirety, by reference.

GOVERNMENT RIGHTS

This invention was made with government support under contract number FA864922P0617-F2D-2959-D2P2 (Lightweight, power efficient electric generators) awarded by the United States Air Force under the AFWERX program. The government has certain rights in the invention.

FIELD

Illustrative embodiments of the invention generally relate to power generation and, more particularly, various embodiments of the invention relate to a generator.

BACKGROUND

A generator may provide power where a utility grid is inaccessible or inefficient. Some applications are transient, requiring the generator to be regularly moved. To maintain portability, the generator must be of a transportable size and weight, while also outputting power at a rating sufficient for the application. Certain generators are configured to directly connect a load to the output of an electric machine. In order to output power according to the requirements of the load, the electric machine must rotate at a constant speed, regardless of output power demand.

SUMMARY OF VARIOUS EMBODIMENTS

In accordance with one embodiment of the invention, a portable generator has an electric machine and a prime mover to rotate the electric machine. The portable generator has a power converter to receive power from the electric machine, convert the received power, and output the converted power. The portable generator has a housing to enclose the electric machine, the prime mover, and the power converter. The portable generator has a control system. The control system operates the power converter to output the converted power at a power rating of at least 600 kW. The control system then determines an output power demand and determines a rotational speed target after determining the output power demand. The control system then reduces a rotational speed of the electrical machine using the power converter after determining the rotational speed target.

The control system may determine a wet stacking event is occurring, determine a second rotational speed target after determining the wet stacking event is occurring, and increase the rotational speed of the electric machine after determining the second rotational speed target. The control system may determine a torque target after determining the output power demand, and adjusting an output torque of the prime mover after determining the torque target.

In some embodiments, at least one of the electric machine or the power converter is enclosed. The portable generator may include a liquid-based cooling system to flood the at least one of the electric machine or the power converter with coolant.

In some embodiments, the portable generator has a fuel storage system enclosed within the housing. The fuel storage system stores a fuel and provides the fuel to the prime mover.

The housing may have a footprint less than or equal to 66 square feet. The portable generator may include a dry weight less than or equal to 7,500 pounds. The footprint may have a floor length less than 108 inches and floor width less than 88 inches.

In accordance with another embodiment of the invention, a method operates a portable generator. The portable generator has an electric machine, a prime mover configured to rotate the electric machine, a power converter configured to receive power from the electric machine, convert the received power, and output the converted power, a housing configured to enclose the electric machine, the prime mover, the power converter, and a control system. The method operates the power converter to output the converted power at a power rating of at least 600 kW. The method determines an output power demand and determines a rotational speed target after determining the output power demand. The method then reduces a rotational speed of the electrical machine using the power converter after determining the rotational speed target.

In accordance with another embodiment of the invention, a portable generator has a housing including a footprint less than or equal to 66 square feet. The housing is configured to enclose an electric machine; a prime mover configured to rotate the electric machine; a power converter configured to receive power from the electric machine, convert the received power, and output the converted power; and a control system. The control system determines an output power demand and determines a rotational speed target after determining the output power demand. The control system reduces a rotational speed of the electrical machine using the power converter after determining the rotational speed target.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 6 is a table showing exemplary specifications for the generator in accordance with various embodiments.

DESCRIPTION OF ILLUSTRATIVE EMBODIMENTS

In illustrative embodiments, a generator is a self-contained unit having weight and size dimensions that allow it to be portable, while also having a high-power output. For example, the generator may have dimensions to fit on a 463L cargo pallet having a weight that does not exceed the weight capacity for the pallet while being able to output power in excess of 600 kW. Details of illustrative embodiments are discussed below.

Figure 1:
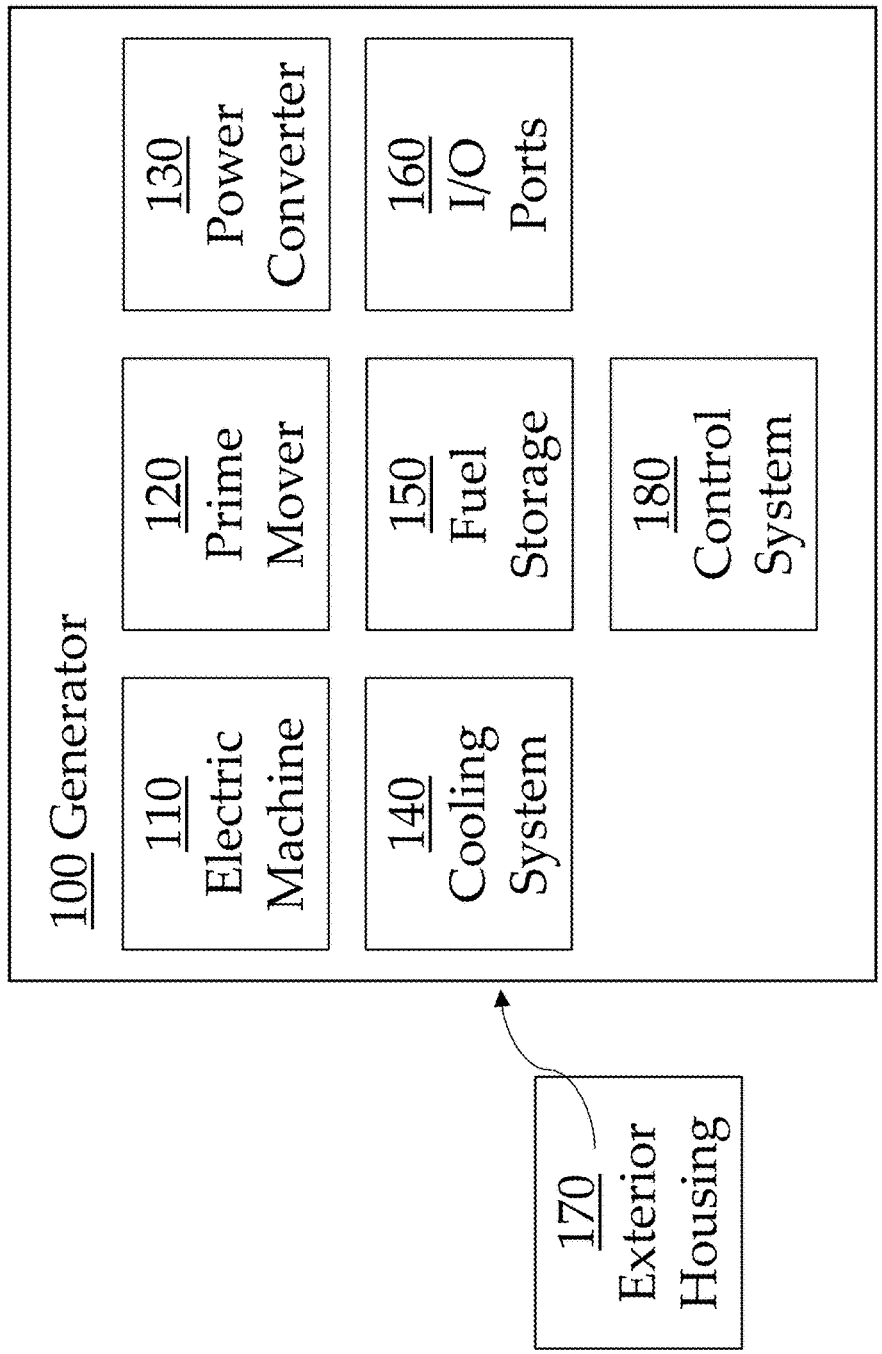
FIG. 1 is a box diagram showing a generator in accordance with various embodiments.
Figure 2B:
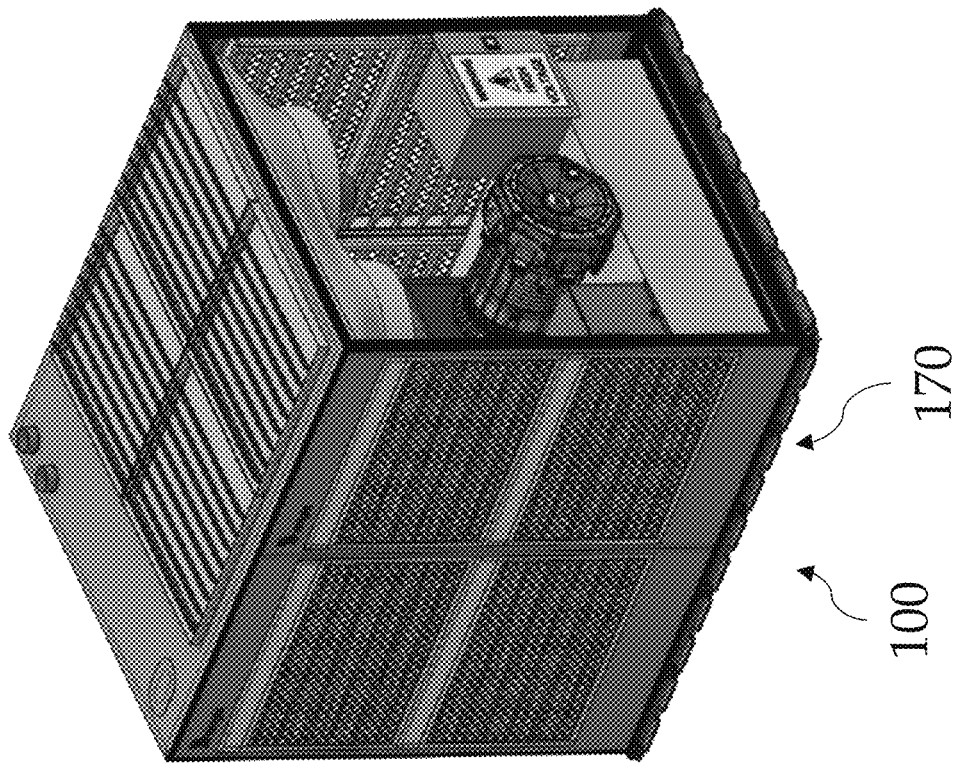
FIGS. 2A and 2B schematically show the generator in accordance with various embodiments.
Figure 2A:
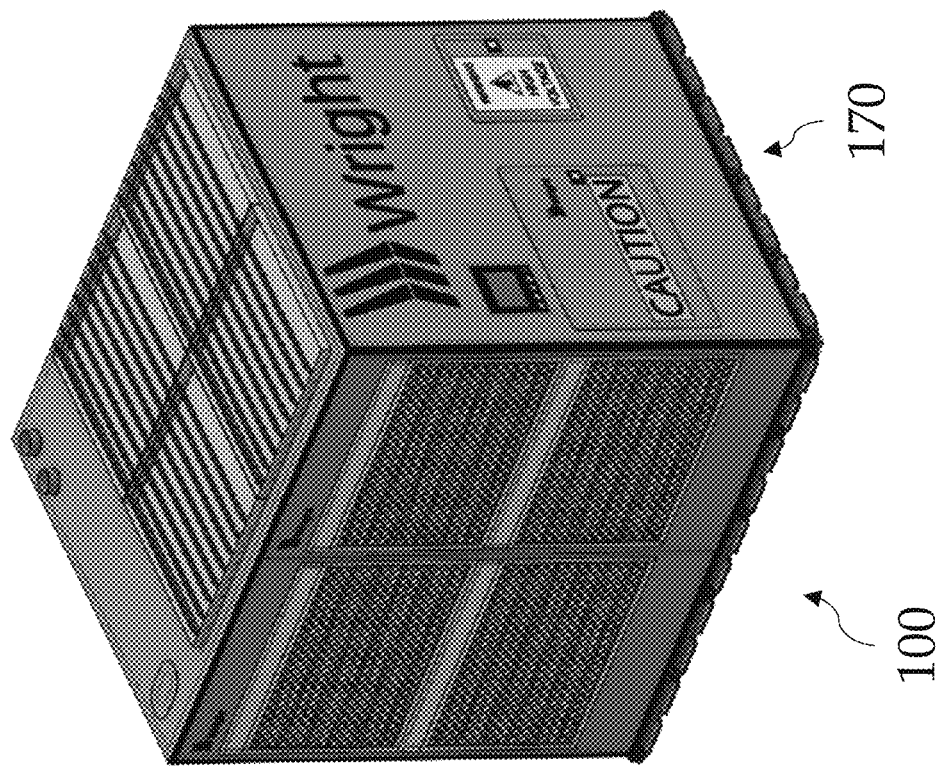

FIGS. 1 and 2A-2B show a generator 100 in accordance with various embodiments. The generator 100 is portable, allowing the generator 100 to be moved to operate in different locations. The generator 100 may fit on an air cargo pallet, such as a 463L pallet, which has a footprint of 88 inches by 108 inches, or 66 square feet, and has a weight capacity of 10,000 pounds. In some embodiments, the generator 100 has a footprint less than or equal to 66 square feet, a length less than or equal to 108 inches, or a width less than or equal to 88 inches. The generator 100 may also have a dry weight (i.e., weight with an empty fuel storage container 150) less than or equal to 10,000 pounds. For example, the generator 100 may have a dry weight less than or equal to 7,500 pounds.

Even though the generator 100 is portable, the generator 100 may be rated to output power at a magnitude equal to or greater than 100 kW, 500 kW, or 600 kw, among other ratings. An exemplary set of specifications for the generator 100 is illustrated in the table of FIG. 6.

The generator 100 has a prime mover 120 configured to consume fuel and rotate a prime mover shaft. For example, the prime mover 120 may be an internal combustion engine. The fuel may be diesel fuel, jet propellant 8 fuel, Jet A fuel, or Jet B fuel, among other things. The prime mover 120 may consume one or more types of fuel. The prime mover 120 may have a horsepower rating of at least 1000 hp.

The fuel consumed by the prime mover 120 may be stored in a fuel storage container 150 configured to store fuel within the exterior housing 170 and provide fuel to the prime mover 120. In some embodiments, the fuel storage container 150 has a capacity of at least 400 gallons.

The generator 100 has an electric machine 110 configured to convert the kinetic energy of the rotating prime mover shaft to electric energy. The electric machine 110 is coupled to the prime mover 120 configured to provide kinetic energy in the form of rotational force to the electric machine 110. Among other things, the electric machine 110 may be a synchronous machine or an induction machine. The electric machine 110 may be configured to output single phase power or multi-phase power.

The electric machine 110 has a shaft configured to rotate and receive kinetic energy from the prime mover 120. In some embodiments, the electric machine 110 and the prime mover 120 share the same shaft. In other embodiments, the shaft of the prime mover 120 and the shaft of the electrical machine 110 are coupled together.

The electric machine 110 has a rotor configured to rotate concentrically with the shaft. In some embodiments, the rotor is coupled to the shaft. In other embodiments, the shaft is incorporated into the rotor. The rotor has one or more electric field devices for generating an electric field. The electric field devices may be windings, or permanent magnets, among other things.

The electric machine 110 has a stator configured to interact with the electric field generated by the rotor to generate alternating current (AC) power. The stator may have one or more windings located around stator teeth.

The generator 110 has a power converter 130 to control variables of the operation of the electric machine 110, such as rotational speed or torque. Among other things, the power converter 130 may adjust the rotational speed of the shaft and rotor of the electric machine 110. Since the shaft of the prime mover 120 is coupled to the shaft of the electric machine 110, the power converter 130 also indirectly adjusts the rotational speed of the prime mover 120 shaft. By adjusting the speed of the electric machine 110, the operation of the power converter 130 may indirectly control the magnitude of the torque output by the prime mover 120 and received by the electric machine 110. For example, as the power converter 130 slows, the rotational speed of the electric machine 110, the output torque of the prime mover 120 may increase.

The power converter 130 may also control the output of the power from the generator 100. The power generated by the electric machine 110 has a voltage, a current, and frequency, among other power characteristics. The output power required by the electric loads powered by the generator 100 may vary based on the application. The output power is independent of the voltage, current, and frequency of the input power received by the power converter 130, as the input power is configured to control the speed and torque of the electric machine 110 to maximize efficiency. Therefore, the power converter 130 converts the received power into the power required by connected electric loads.

In some embodiments, the power converter 130 receives AC power from the electric machine 110, then converts the received AC power to DC power, then converts the DC power to AC power with power characteristics required by the connected loads.

In some embodiments, the output power that is output by the power converter 130 may be adjusted based on the power requirements of the connected loads or the operation of the power converter 130. For example, the output power may be controlled to have a voltage of 120V, 208V, 240V, or 416V, among other voltages. Furthermore, the output power may be controlled to have a frequency of 50 Hz, 60 Hz, or 400 Hz, among other frequencies.

Figure 3:
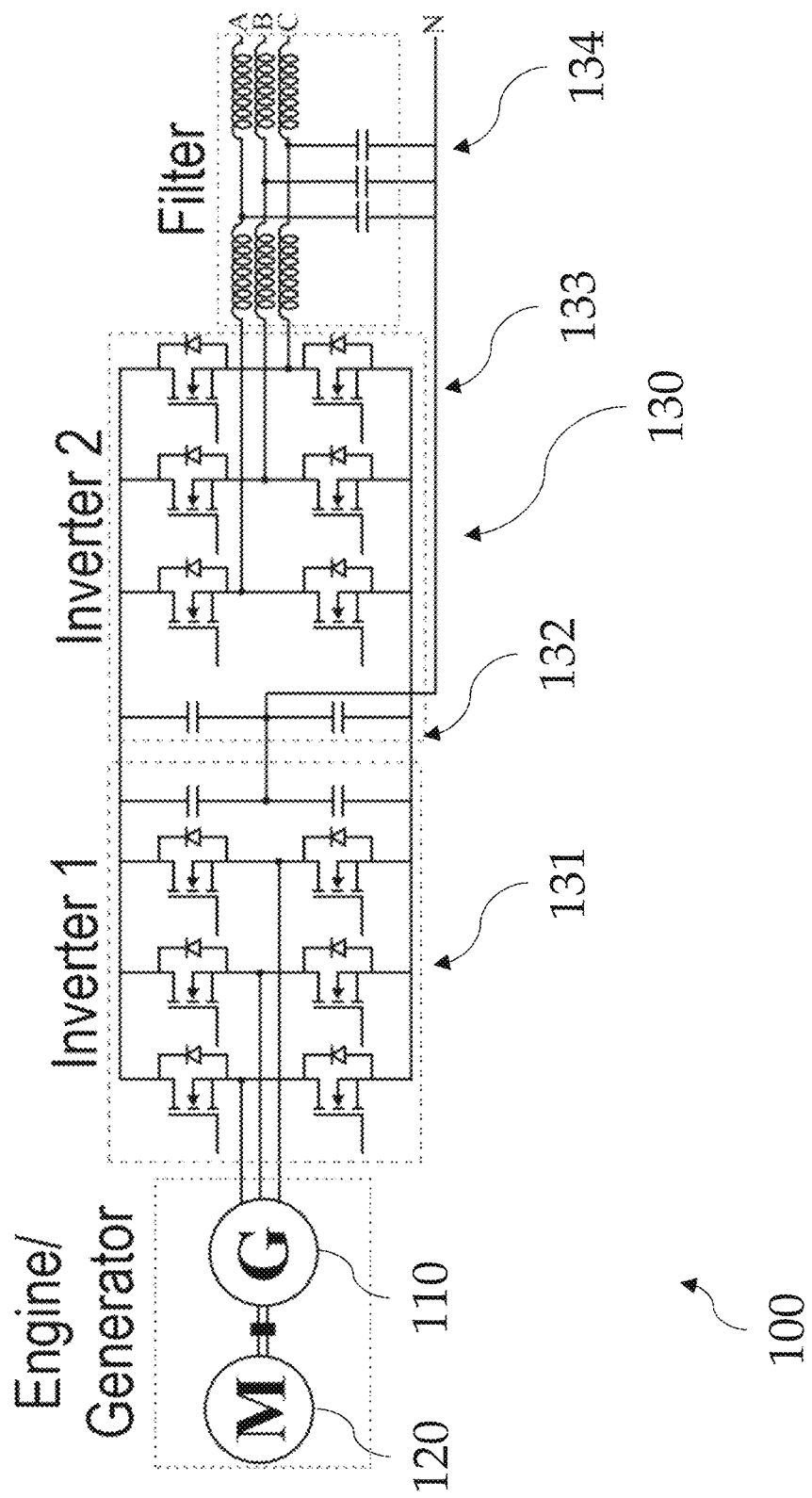
FIG. 3 is a circuit diagram showing the power converter and electric machine in accordance with various embodiments.

One exemplary topology of the power converter 130 within the generator 100 is illustrated in FIG. 3, though the power converter 130 or the generator 100 may have a different topology in other embodiments. As shown, the prime mover 120 and the electrical machine 110 share a common shaft. The power converter 130 is configured to receive three phase power from the electric machine. The power converter 130 includes two power converters 131, 133, each of which has a two level, three phase power switch configuration. The power converters 131, 133 are arranged in a back-to-back configuration coupled by a direct current (DC) bus 132 having DC link capacitors. The output of the power converter 130 includes a filter 134 configured to reduce harmonics in the output power. The power converter 131 is coupled to the electric machine 110 and configured to actively rectify the power received from the electric machine 110 as a means of controlling the electric machine 110. It should be appreciated that the topology of the power converter 130 illustrated in FIG. 3 is illustrated for the purpose of explanation and is not intended as a limitation of the present disclosure. For example, the power converter 130 may receive any number of phases from the electric machine 110, and may output power including any number of phases or DC current. The power converter 130 may have more or fewer power switches, more levels, or other switch configurations, so long as the power converter 130 is configured to actively convert the power from the electric machine 110 to power having a different voltage, current, or frequency, suitable for a connected load. In some embodiments, the power converter 130 may have a passive semiconductor configuration configured to rectify the power from the electric machine 110 without using power switches (e.g., using diodes).

Among other things, the power switches of the power converter 130 may be wide bandgap power switches, such as silicon carbide (SiC) power switches (e.g., SiC MOSFETs) or gallium nitride (GaN) power switches (e.g., GaN FETs or GaN E-HEMTs). By using a wide bandgap device instead of Si-based power switches, the heat loss from switching may be reduced, thus reducing the need for cooling from the cooling system 140.

In some embodiments, the size of the DC link capacitors, filter 134 and other passive components of the power converter 130, the control system 180, or other components of the generator 100 may be reduced by using the high switching frequency capabilities of wide bandgap power switches.

The generator 100 may have a control system 180 to operate the controllable elements of the generator 100, such as the prime mover 120, the power converter 130, and the cooling system 140.

In some embodiments, the control system 180 has measurement devices, such as one or more sensors, to measure characteristics of the generator 100. For example, the control system 180 may include one or more sensors to determine output voltage, output frequency, output power demand, output current, fuel storage level, ambient temperature, generator component temperature, coolant flow rate, vibration, air quality, DC link voltage, or DC link current, among other things. The control system 180 may also receive external data, such as output power demand data indicating forecasted or present power required by the connected loads, or fault data indicating a fault in the distribution network connected to the generator 100. In some embodiments, the control system 180 may determine output power demand using a measuring device. For example, the control system 180 determines the output power demand by measuring the output power magnitudes or frequency, among other things. The control system 180 may include voltage and current sensors to measure the power conducted between the output ports 160 and the power converter 130 to determine output power demand.

The control system 180 may receive a measurement or other data indicating unburned fuel clogging the exhaust (i.e., wet stacking) is likely to occur or is occurring. For example, the control system 180 may receive a generator component temperature measurement indicating wet stacking, among other things. In another example, the control system 180 may determine wet stacking is occurring based on a schedule or time interval.

The control system 180 may operate the controllable elements of the generator 100 in response to the measurements, the external data, or a schedule, among other triggers. In certain embodiments, the control system 180 operates the prime mover 120 and/or power converter 130 to control the speed of the electric machine 110 and the output torque of the prime mover 120. For example, the control system 180 may operate the power converter 130 to adjust the rotational speed of the electrical machine 110 based on a rotational speed target. The control system 180 may operate the power switches of the power converter 130 to control the power received by the power converter 130, and thus control the speed of the electrical machine 110. In some embodiments, the control system operates the power switches according to a duty cycle and/or a switching frequency in order to control the speed and torque of the electric machine 110. For a power converter 130 with wideband gap power switches, the control system 180 may use a switching frequency greater than the switching frequency range of other power switches, such as Si-based IGBTs. By raising the switching frequency, the size and weight of the filter components of the generator 100, such as the DC link capacitor of the power converter, may be reduced, contributing to the portability of the generator 100.

The control system 180 may operate the prime mover 120 to adjust the output torque of the prime mover 120. For example, the control system 180 may control the throttle of a prime mover 120 to increase or decrease the torque of the prime mover 120. The control system 180 may control the prime mover 120 to output a torque based on a torque target corresponding to the torque.

The control system 180 may operate the power converter 130 or the prime mover 120 in response to determining data related to the generator 100 or the environment of the generator 100, also known as triggers. The control system 180 may adjust the rotational speed of the electric machine 110 or the output torque of the prime mover 120 in response to determining an output power demand is changing or determining an adverse generator characteristic, such as overheating, low fuel, or wet stacking. For example, after the output power demand lowers, the control system 180 may lower the speed of the electric machine 110. To give another example, the control system may increase the rotational speed of the electric machine 110 after determining wet stacking is occurring in the prime mover 120.

When the electrical demand is low, the control system 180 may reduce the revolutions per minute (RPM), also known as speed or rotational speed, of the prime mover 120 to an RPM that is more fuel efficient. The power converter 130 allows for the rotational speed of the prime mover 120 to be adjusted, whereas a generator directly connected to a distribution network without a power converter cannot adjust speed. In some embodiments, the control system 180 may use a lookup table to determine a speed target value. For example, at a maximum load demand, the speed target value will be a maximum speed. For partial loads, the speed target value will correspond to the magnitude of the demand. Generally, the generator 100 may control the speed to maintain high prime mover 120 torque output.

Hardware components of the control system 180 and the power converter 130 may be arranged on one or more circuit boards (e.g., printed circuit boards). In some embodiments, the circuit boards may be incorporated into the electric machine 110, attached to a heat sink on the exterior housing 170, or located elsewhere within the exterior housing 170.

The generator 100 may have a cooling system 140 configured to cool the components of the generator 100. The cooling system 140 may have a liquid cooling system and/or an air-cooling system.

In some embodiments, the liquid cooling system 140 may flood enclosed components with coolant and circulate the coolant. For example, the electric machine 110, the control system 180, and the power converter 130 may be located in fully enclosed housings, such that the liquid cooling system may flood the components with coolant and then circulate the coolant among the component housings. In some embodiments, the circuit boards of the control system 180 and the power converter 130 may be arranged such that the coolant flows over the circuit elements of the circuit boards in a particular order. Among other things, the circuit boards and the liquid cooling system may be arranged such that coolant flows through the power switches of the power converter 130 last so that the heat from the power switches does not heat the rest of the circuit board elements. By flooding one or more components of the generator 100, the liquid cooling system 140 may more efficiently remove heat from the generator 100, thus reducing the size and weight of the generator 100 compared to another type of system, such as an air-cooled system.

In some embodiments, the air-cooling system has a heat sink attached to the exterior housing 170 and a heat-generating component, such as the electric machine 110 or the power converter 130, among other things. The air-cooling system may also include one or more fans to blow air over the heat sink or generator components.

The generator 100 may have an exterior housing 170 incorporating the other components of the generator 100. As shown in FIG. 2B, one or more panels of the exterior housing 170 may be removable to access the inner components for maintenance or repairs, among other things. The exterior housing 170 may have one or more vents to exchange air between the environment and the inner chamber of the exterior housing 170.

Figure 4:
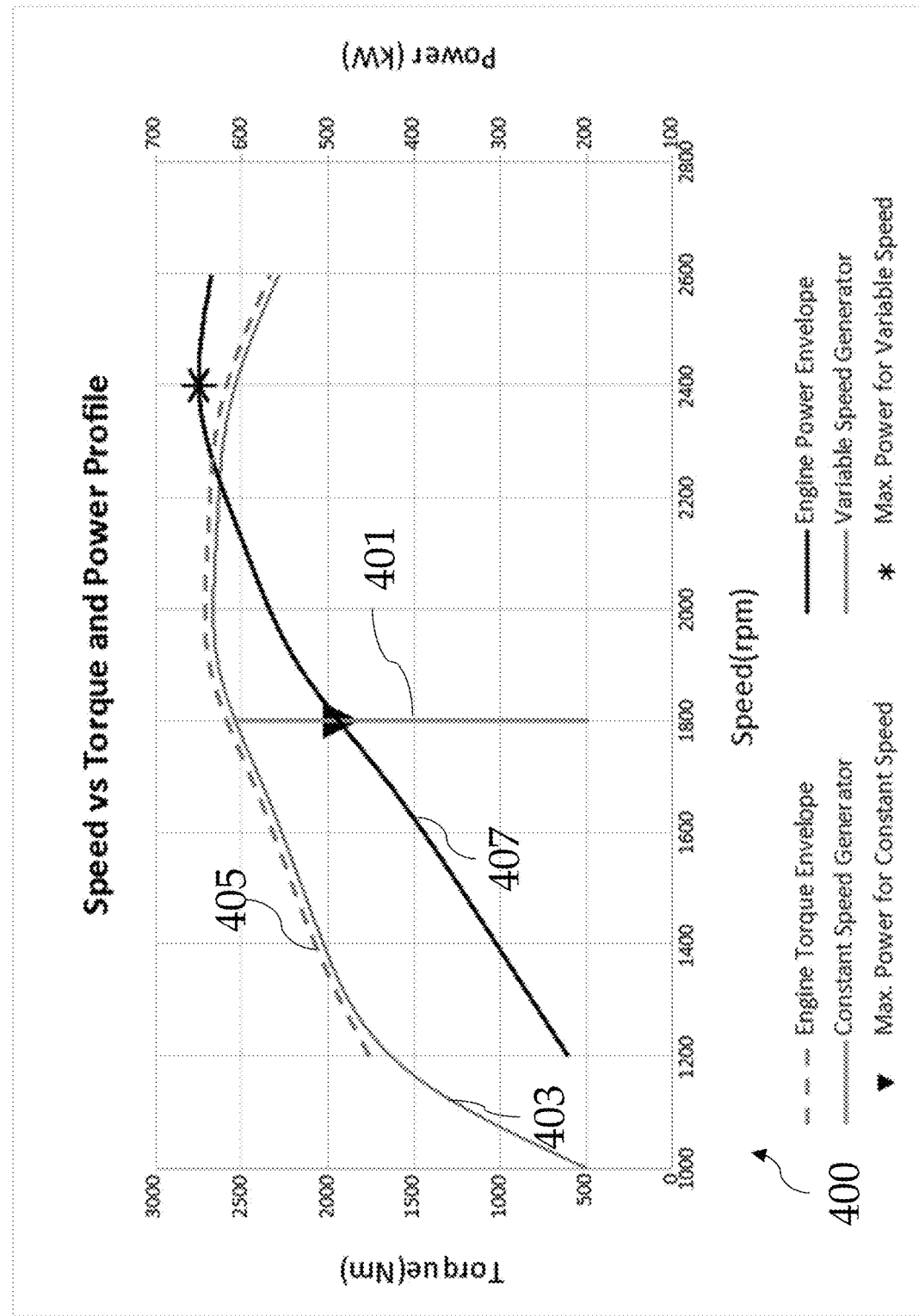
FIG. 4 is a graph showing a speed torque profile of the generator in accordance with various embodiments.

The exterior housing 170 may include ports 160 for depositing fuel in the fuel storage container 150. For example, the housing may have a fuel filler accessible from the outside of the exterior housing 170. The housing may also have a port 160 for outputting power from the power converter 130. For example, the exterior housing 170 may have an outlet or plug to couple the generator 100 to an electric load or distribution network. FIG. 4 shows a graph 400 illustrating the relationship between rotational speed, torque, and output power for the generator 100. The graph shows a line 403 representing a prime mover 120 output torque over a range of rotational speeds. The output torque line 403 follows a line 405 representing the engine envelope, or the maximum torque output of the prime mover 120 over a range of rotational speeds. The graph also shows a line 407 representing the output power of the generator 100 when operated at the engine envelope for a given rotational speed. It is important to note that the generator 100 is able to output a range of output power by controlling the output torque and the rotational speed. The generator 100 may operate the electric machine 110 over a range of speeds since the frequency of the output power is determined by the switching operation of the power converter 130, not the rotational speed of the electric machine 110. In contrast, the conventional synchronous generator as represented by line 401, must maintain a constant speed regardless of the output torque, which means the conventional generator does not operate at engine envelope consistently. As shown by line 407, the power rating of the conventional synchronous generator is less than the generator 100, as the generator 100 is configured to operate at higher rotational speeds.

The generator 100 may adjust the rotational speed of the electric machine 110 and the torque output of the prime mover 120 to maintain the torque output of the prime mover 120 at or near the maximum torque output at the given speed for the prime mover 120. In this way, the prime mover 120, which is most efficient along the maximum torque output line, operates at a greater efficiency compared to a fixed speed generator when supplying power to a varying load.

Figure 5:
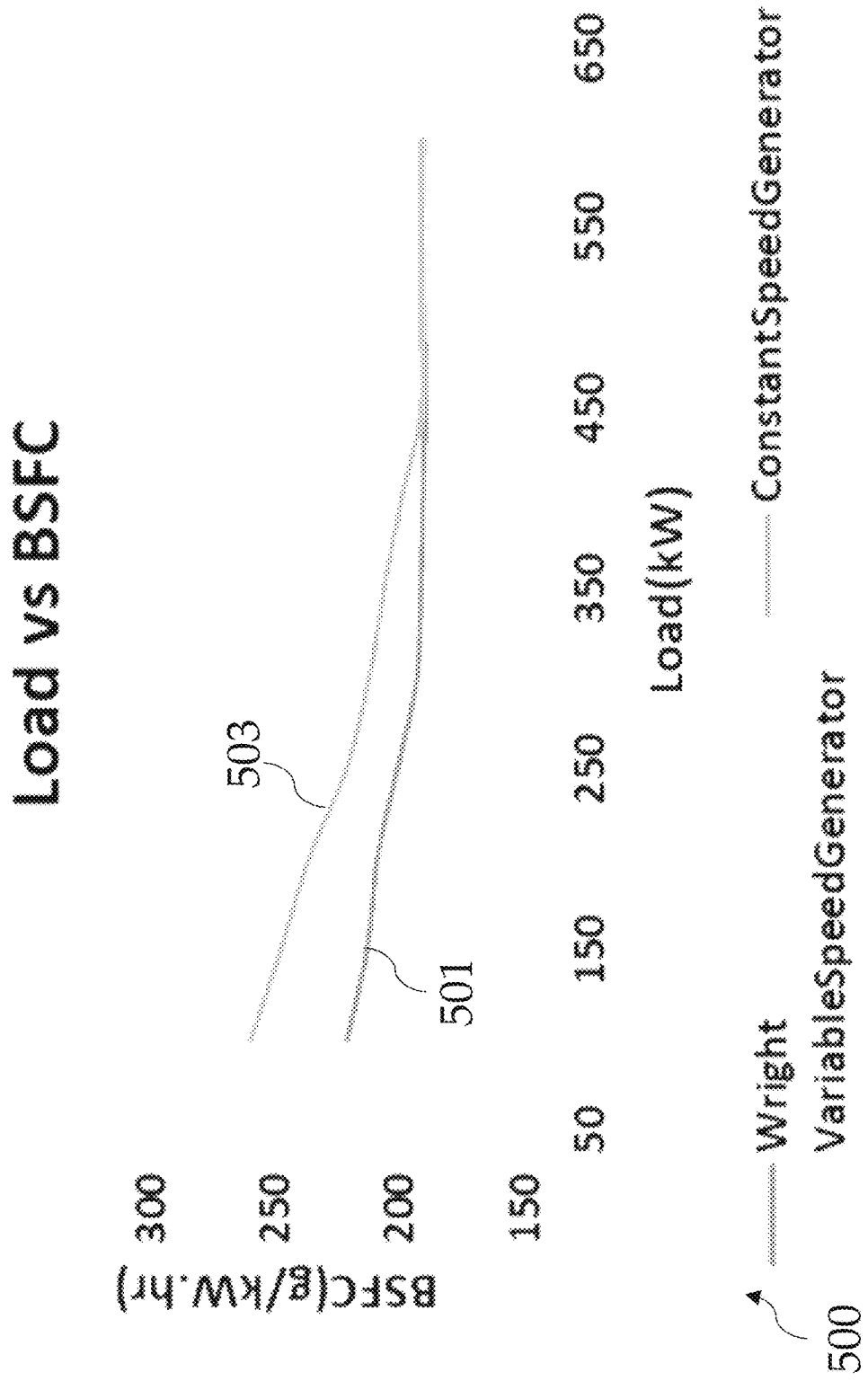
FIG. 5 is a graph showing the brake specific fuel consumption relative to load for the generator in accordance with various embodiments.

FIG. 5 shows a graph 500 showing the brake specific fuel consumption (BSFC) for the prime mover 120 relative to power consumption for both the generator 100 and a conventional synchronous generator in accordance with various embodiments. The graph includes a line 501 corresponding to the output of the generator 100 and a line 503 corresponding to the output of the conventional synchronous generator. As shown in the graph, the fuel consumption for the generator 100 during periods of low electrical load demands is less than the fuel consumption for the conventional synchronous generator. Because the generator 100 is configured to control the rotational speed and torque received by the electric machine 110, the output of the electric machine 110 corresponds to the power demand of the loads coupled to the generator 100, thus increasing the efficiency of the generator compared to fixed speed generators.

Figure 7:
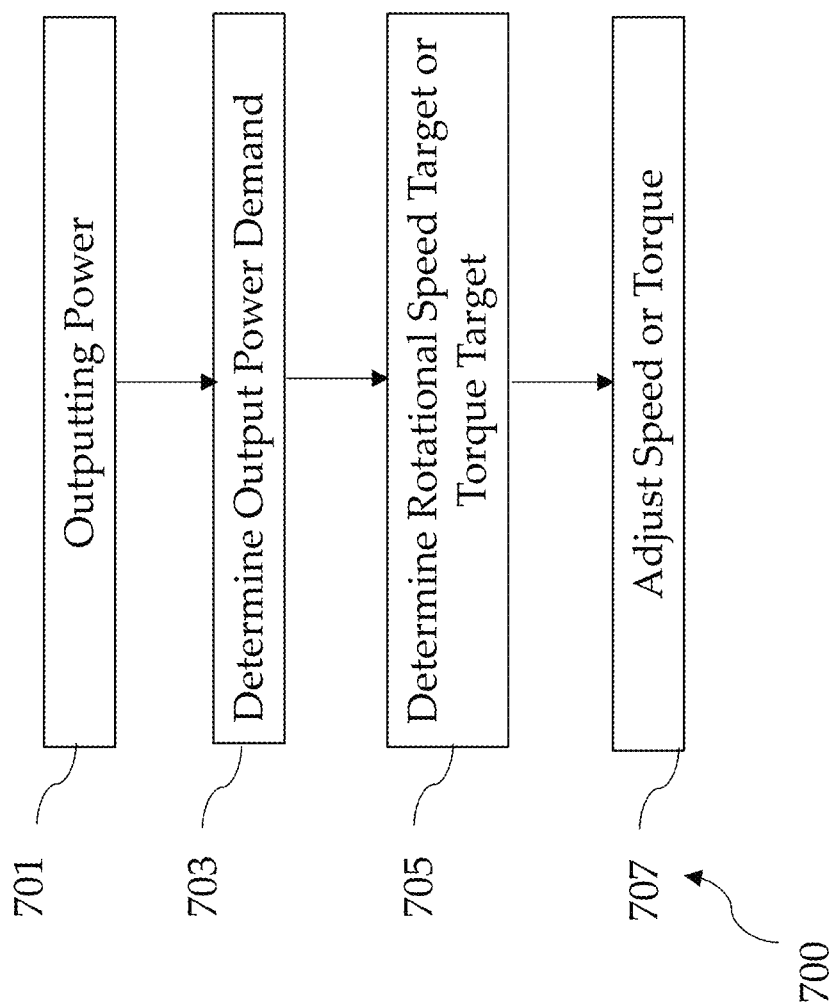
FIG. 7 is a flowchart showing a process executed by the generator in accordance with various embodiments.

FIG. 7 shows an exemplary process 600 for operating the generator 100 in accordance with illustrative embodiment. In certain forms the functionalities of the control system 180 may be performed by a device remote from the housing 170. In certain forms all functionalities may be performed locally by the control system 180. It shall be further appreciated that a number of variations and modifications to the Process 700 are contemplated including, for example, the omission of one or more aspects of the Process 700, the addition of further conditionals and operations, or the reorganization or separation of operations and conditionals into separate processes.

The Process 700 begins by the generator 100 outputting power to an electrical load in operation 701. The load may be a single load or a network of loads, among other things. The generator 100 may output power at or near the power rating of the generator 100. For example, the generator 100 may output power of at least 600 kW.

The Process 700 then proceeds to operation 703 where the control system 180 determines the output power demand of the electrical load. In some embodiments, the control system 180 determines the output power demand by determining power characteristics of the output power, such as the voltage magnitude, current magnitude, or frequency of the power output by the power converter 130. In some embodiments, the control system 180 communicates with another device and determines the output power demand by receiving instructions or data indicating an output power demand. The output power demand may be lower or higher than the current output power. For example, the output power demand may be a low power demand, such as an output power demand less than 50% of the power rating of the generator 100.

The Process 700 then proceeds to operation 705 where the control system 180 determines at least one of a rotational speed target or an output torque target based on the output power demand determined in operation 703. As shown in FIG. 4, once the output power demand is known, the control system 180 may determine the rotational speed target based on the rotational speed corresponding to the output power value corresponding to the output power demand. The control system 180 may then select then output torque target corresponding to the output torque at the engine envelope for the given rotational speed. In some embodiments, the control system 180 determines the targets using a lookup table.

The Process 700 then proceeds to operation 707 where the control system 180 adjusts the output torque by controlling the prime mover 120 or adjusts the rotational speed by controlling the power converter 130. For example, where the output power demand is less than the current output power, the control system 180 reduces the rotational speed to the speed corresponding to the rotational speed target. Because the generator 100 operates at the engine envelope during low output power demand, the generator 100 consumes less fuel compared to a constant speed generator experiencing lower output power demand.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional terms "having," "has," and "have" are open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. A portable generator, comprising:
an electric machine;
a prime mover configured to rotate the electric machine;
a power converter configured to receive power from the electric machine, convert the received power, and output the converted power;
a housing configured to enclose the electric machine, the prime mover, and the power converter; and
a control system configured to:
operate the power converter to output the converted power at a power rating of at least 600 kW,
determine an output power demand,
determine a rotational speed target after determining the output power demand,
reducing a rotational speed of the electrical machine using the power converter after determining the rotational speed target,
determine a wet stacking event is occurring,
determine a second rotational speed target after determining the wet stacking event is occurring, and
increase the rotational speed of the electric machine after determining the second rotational speed target.

2. The portable generator of claim 1, wherein the control system determines a torque target after determining the output power demand, and adjusting an output torque of the prime mover after determining the torque target.

3. The portable generator of claim 1, wherein:
at least one of the electric machine or the power converter is enclosed, and
the portable generator includes a liquid-based cooling system configured to flood the at least one of the electric machine or the power converter with coolant.

4. The portable generator of claim 1, comprising:
a fuel storage system enclosed within the housing, and configured to store a fuel and provide the fuel to the prime mover.

5. The portable generator of claim 1,
wherein the housing includes a footprint less than or equal to 66 square feet, and
wherein the portable generator includes a dry weight less than or equal to 7,500 pounds.

6. The portable generator of claim 5, wherein the footprint of the portable generator includes a floor length less than 108 inches and floor width less than 88 inches.

7. A method, comprising:
operating a portable generator including:
an electric machine,
a prime mover configured to rotate the electric machine,
a power converter configured to receive power from the electric machine, convert the received power, and output the converted power,
a housing configured to enclose the electric machine, the prime mover, and the power converter, and
a control system;
operating the power converter to output the converted power at a power rating of at least 600 KW;
determining an output power demand;
determining a rotational speed target after determining the output power demand;
reducing a rotational speed of the electrical machine using the power converter after determining the rotational speed target;
determining a wet stacking event is occurring;
determining a second rotational speed target after determining the wet stacking event is occurring; and
increasing the rotational speed of the electric machine after determining the second rotational speed target.

8. The method of claim 7, wherein the control system determines a torque target after determining the output power demand, and adjusting an output torque of the prime mover after determining the torque target.

9. The method of claim 7, wherein:
at least one of the electric machine or the power converter is enclosed, and the method comprises the portable generator includes a liquid-based cooling system configured to flood the at least one of the electric machine or the power converter with coolant.

10. The method of claim 7, wherein:
the housing includes a footprint less than or equal to 66 square feet, and
the portable generator includes a dry weight less than or equal to 7,500 pounds.

11. The method of claim 10, wherein the footprint of the portable generator includes a floor length less than 108 inches and floor width less than 88 inches.

12. A portable generator, comprising:
a housing including a footprint less than or equal to 66 square feet and configured to enclose:
an electric machine;
a prime mover configured to rotate the electric machine;
a power converter configured to receive power from the electric machine, convert the received power, and output the converted power; and
a control system configured to:
determine an output power demand,
determine a rotational speed target after determining the output power demand,
reducing a rotational speed of the electrical machine using the power converter after determining the rotational speed target,
determine a wet stacking event is occurring,
determine a second rotational speed target after determining the wet stacking event is occurring, and
increase the rotational speed of the electric machine after determining the second rotational speed target.

13. The portable generator of claim 12, wherein the control system determines a torque target after determining the output power demand, and adjusting an output torque of the prime mover after determining the torque target.

14. The portable generator of claim 12, wherein:
at least one of the electric machine or the power converter is enclosed, and
the portable generator includes a liquid-based cooling system configured to flood the at least one of the electric machine or the power converter with coolant.

15. The portable generator of claim 12, comprising:
a fuel storage system enclosed within the housing, and configured to store a fuel and provide the fuel to the prime mover.

16. The portable generator of claim 12,
wherein the power converter is configured to output the converted power at a power rating of at least 600 kW, and
wherein the portable generator includes a dry weight less than or equal to 7,500 pounds.

17. The portable generator of claim 12, wherein the footprint of the portable generator includes a floor length less than 108 inches and floor width less than 88 inches.

* * * * *